United States Patent
Raskin et al.

(10) Patent No.: US 9,231,921 B2
(45) Date of Patent: Jan. 5, 2016

(54) SYSTEM AND ARCHITECTURE FOR SECURE COMPUTER DEVICES

(71) Applicant: JANUS TECHNOLOGIES, INC., Half Moon Bay, CA (US)

(72) Inventors: Sofin Raskin, Los Altos, CA (US); Michael Wang, Taipei (TW); Joshua Porten, Austin, TX (US); Shaoan Chin, Cupertino, CA (US)

(73) Assignee: Janus Technologies, Inc., Half Moon Bay, CA (US)

( * ) Notice: Subject to any disclaimer, the term of this patent is extended or adjusted under 35 U.S.C. 154(b) by 60 days.

(21) Appl. No.: 13/971,677

(22) Filed: Aug. 20, 2013

(65) Prior Publication Data

US 2015/0058970 A1    Feb. 26, 2015

(51) Int. Cl.
| | |
|---|---|
| G06F 12/14 | (2006.01) |
| G06F 11/00 | (2006.01) |
| H04L 29/06 | (2006.01) |
| G06F 17/30 | (2006.01) |
| G06F 12/16 | (2006.01) |

(52) U.S. Cl.
CPC ............ *H04L 63/0428* (2013.01); *H04L 63/12* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 4,598,170 A | 7/1986 | Piosenka et al. | |
| 5,191,542 A | 3/1993 | Murofushi | |
| 5,724,027 A | 3/1998 | Shipman et al. | |
| 5,946,469 A * | 8/1999 | Chidester | G06F 3/023 345/157 |
| 5,960,172 A | 9/1999 | Hwang | |
| 6,061,794 A | 5/2000 | Angelo et al. | |
| 6,088,802 A | 7/2000 | Bialick et al. | |
| 6,457,164 B1 | 9/2002 | Hwang et al. | |
| 6,507,914 B1 | 1/2003 | Cain et al. | |

(Continued)

FOREIGN PATENT DOCUMENTS

| | | |
|---|---|---|
| EP | 2517144 | 7/2011 |
| EP | 2407905 | 1/2012 |

(Continued)

OTHER PUBLICATIONS

Garfinkel, "Terra: A Virtual Machine-Based Platform for Trusted Computing", ACM SOSP. Proc. of the ACM Symp. on Operating system Printciples, Oct. 22, 2003, pp. 193-206.

(Continued)

*Primary Examiner* — Dede Zecher
*Assistant Examiner* — Trang Doan
(74) *Attorney, Agent, or Firm* — Foley & Lardner LLP; Mark J. Danielson

(57) ABSTRACT

The present invention relates to a system and architecture for securing otherwise unsecured computer subsystems. According to one aspect, the invention provides an independent hardware platform for running software in a secure manner. According to another aspect, the invention provides the means to control and secure all disk, network and other I/O transactions. According to still further aspects, the invention provides a means to monitor and prevent unauthorized user and malicious software activity Additional aspects include providing a secure platform for device and user authentication as well as encryption key management, providing a means to perform background backup snapshots, and providing the means for enabling full management over computer operations.

20 Claims, 3 Drawing Sheets

(56) References Cited

U.S. PATENT DOCUMENTS

| | | |
|---|---|---|
| 6,546,491 B1 | 4/2003 | Challener et al. |
| 6,594,780 B1 | 7/2003 | Shen et al. |
| 6,725,438 B2 | 4/2004 | Van Ginneken |
| 6,782,424 B2 | 8/2004 | Yodaiken |
| 6,820,160 B1 | 11/2004 | Allman |
| 6,922,817 B2 | 7/2005 | Bradfield et al. |
| 7,120,892 B1 | 10/2006 | Khol et al. |
| 7,149,992 B2 | 12/2006 | Chang et al. |
| 7,240,303 B1 | 7/2007 | Schubert |
| 7,320,071 B1 | 1/2008 | Friedman et al. |
| 7,330,891 B2 | 2/2008 | Yodaiken |
| 7,337,100 B1 | 2/2008 | Hutton et al. |
| 7,340,700 B2 | 3/2008 | Emerson |
| 7,350,204 B2 | 3/2008 | Lambert et al. |
| 7,396,257 B2 | 7/2008 | Takahashi |
| 7,406,711 B2* | 7/2008 | Fuchs .................. G06F 11/0745 713/172 |
| 7,469,343 B2 | 12/2008 | Ray |
| 7,478,235 B2 | 1/2009 | England et al. |
| 7,516,217 B2 | 4/2009 | Yodaiken |
| 7,635,272 B2 | 12/2009 | Poppe |
| 7,677,065 B1 | 3/2010 | Miao |
| 7,962,755 B2 | 6/2011 | Pizano et al. |
| 7,971,241 B2* | 6/2011 | Guyot ..................... G06F 21/80 380/279 |
| 7,987,497 B1 | 7/2011 | Giles et al. |
| 8,171,310 B2* | 5/2012 | Yan ....................... H04L 9/3271 713/193 |
| 8,402,529 B1 | 3/2013 | Green et al. |
| 8,429,419 B2 | 4/2013 | Endrys |
| 8,566,934 B2 | 10/2013 | Srivastava |
| 8,606,971 B2 | 12/2013 | Cain et al. |
| 8,627,106 B2 | 1/2014 | Pizano et al. |
| 8,631,177 B1* | 1/2014 | Thomas ........................ 710/110 |
| 8,826,461 B2* | 9/2014 | Yu ............................. G06F 21/78 711/163 |
| 2002/0007456 A1 | 1/2002 | Peinado et al. |
| 2002/0069396 A1 | 6/2002 | Bhattacharya et al. |
| 2003/0016825 A1 | 1/2003 | Jones |
| 2003/0126317 A1 | 7/2003 | Chang |
| 2003/0131119 A1* | 7/2003 | Noonan .................. H04L 41/00 709/232 |
| 2004/0003262 A1* | 1/2004 | England ................ G06F 21/606 713/189 |
| 2004/0199879 A1 | 10/2004 | Bradfield |
| 2005/0204404 A1* | 9/2005 | Hrabik ................ H04L 63/1433 726/22 |
| 2005/0240892 A1 | 10/2005 | Broberg et al. |
| 2006/0039468 A1* | 2/2006 | Emerson ............... G06F 3/1454 375/240.01 |
| 2006/0143617 A1* | 6/2006 | Knauerhase ............... G06F 9/50 718/104 |
| 2007/0047782 A1* | 3/2007 | Hull ................... G06K 9/00442 382/124 |
| 2007/0255963 A1 | 11/2007 | Pizano et al. |
| 2008/0091833 A1 | 4/2008 | Pizano et al. |
| 2008/0247540 A1 | 10/2008 | Ahn et al. |
| 2008/0263658 A1 | 10/2008 | Michael et al. |
| 2008/0276302 A1* | 11/2008 | Touboul ................ G06F 21/562 726/3 |
| 2009/0013111 A1 | 1/2009 | Berland et al. |
| 2009/0033668 A1 | 2/2009 | Pederson et al. |
| 2009/0138623 A1* | 5/2009 | Bosch ..................... G06F 21/74 710/14 |
| 2009/0212844 A1 | 8/2009 | Darmawan et al. |
| 2009/0271877 A1* | 10/2009 | Bradley .................. G06F 21/76 726/33 |
| 2010/0024004 A1 | 1/2010 | Boegelund et al. |
| 2010/0192230 A1 | 7/2010 | Steeves et al. |
| 2010/0201400 A1 | 8/2010 | Nardone et al. |
| 2010/0325727 A1* | 12/2010 | Neystadt ................. G06F 21/53 726/22 |
| 2011/0102443 A1 | 5/2011 | Dror et al. |
| 2011/0131423 A1 | 6/2011 | Ponsini |
| 2011/0258460 A1 | 10/2011 | Pizano et al. |
| 2011/0314542 A1* | 12/2011 | Viswanathan ........ G06F 21/554 726/23 |
| 2012/0017197 A1 | 1/2012 | Mehta et al. |
| 2012/0166582 A1* | 6/2012 | Binder ..................... H04L 63/18 709/217 |
| 2012/0192129 A1 | 7/2012 | Bowers |
| 2013/0067534 A1* | 3/2013 | Soffer .................... G06F 3/0227 726/2 |
| 2013/0114831 A1 | 5/2013 | Topchy et al. |
| 2013/0212671 A1 | 8/2013 | Wang et al. |
| 2013/0238908 A1 | 9/2013 | Pizano |
| 2013/0246724 A1* | 9/2013 | Furuya ......................... 711/162 |
| 2013/0254838 A1* | 9/2013 | Ahuja ............... G06F 17/30592 726/1 |
| 2013/0305359 A1* | 11/2013 | Gathala .................. G06F 21/56 726/22 |
| 2013/0347103 A1* | 12/2013 | Veteikis ..................... H04L 1/24 726/22 |
| 2014/0052975 A1* | 2/2014 | Rodgers ................. G06F 21/575 713/2 |
| 2014/0053230 A1* | 2/2014 | Rodgers .................. G06F 21/72 726/1 |
| 2014/0053261 A1* | 2/2014 | Gupta ..................... G06F 21/55 726/22 |
| 2014/0053274 A1* | 2/2014 | Stella ................. H04L 63/0428 726/25 |
| 2014/0053278 A1* | 2/2014 | Dellow .................... G06F 21/60 726/27 |
| 2014/0283049 A1* | 9/2014 | Shnowske ............... G06F 21/55 726/23 |
| 2014/0298454 A1* | 10/2014 | Heng ..................... G06F 21/55 726/22 |

FOREIGN PATENT DOCUMENTS

| | | |
|---|---|---|
| WO | 93/08521 | 4/1993 |
| WO | 01/24054 | 4/2001 |

OTHER PUBLICATIONS

Landau, et al., "SlitX: S;lit Guest/Hypervisor Execution on Multi-Core", 3$^{rd}$ Workshop of IO irtualization, Jun. 14, 2011, pp. 1-7.
International Search Report and Written Opinion issued Dec. 3, 2014 in corresponding PCT/US14/51715.

\* cited by examiner

SYSTEM AND ARCHITECTURE FOR SECURE COMPUTER DEVICES

FIELD OF THE INVENTION

The present invention relates to a system and architecture for securing computer systems having non-secure subsystems.

BACKGROUND OF THE INVENTION

Co-pending application Ser. No. 13/396,582, the contents of which are incorporated herein by reference in their entirety, dramatically advanced the state of the art of computer system security. Nevertheless, certain challenges and opportunities for improvement remain.

Conventional computing devices typically include one to many conventional types of subsystems such as storage, networking, audio/video, I/O interfaces, etc. However, these subsystems are typically inherently unsecure and vulnerable to many different types of threats.

For example, as shown in FIG. 1A, a conventional non-secure computer 150 (e.g. a desktop or notebook computer) includes a host system 102, typically including a CPU running an operating system, application software and device drivers. Computer 150 further includes devices 106 associated with various computer subsystems such as an internal drive 106-1 (e.g. HDD or SSD), audio/video input and output devices 106-2 (e.g. display, speakers, etc.), I/O ports and devices 106-3 (e.g. USB, Firewire, etc.) and network interfaces 106-4 (e.g. WiFi, Ethernet, etc.).

The lack of security over the subsystems associated with these devices results in many vulnerabilities. More particularly, in connection with internal drive 106-1, data stored on it is typically non-encrypted. This means that if it is discarded or surreptitiously inspected (e.g. by someone stealing computer 150 or by virus software on host 102), its contents can be retrieved, including any sensitive, private or confidential data. Further, many users do not regularly back up their data, rendering the data on drive 106-1 vulnerable to drive or system failure.

Even when data is encrypted and/or backed-up, its level of security depends on the specific operating system and application. Further, if encryption keys are also stored locally on computer 150 they can be accessed and used surreptitiously. In connection with audio/video input and output devices 106-2, data displayed or audio played can include sensitive information which is subject to eavesdropping, particularly when computer 150 is being operated in a public place. However, when unauthorized copies of this displayed information are discovered, it is sometimes difficult to prove the source or circumstances of the unauthorized copy.

In connection with I/O ports and devices 106-3, standard I/O communication protocols such as USB do not provide any level of security for the data transmitted from the peripheral devices to the host system. USB data is sent in plain text. Accordingly, the data can be captured and analyzed by any USB protocol analyzer or software application. Moreover, any USB peripheral is capable of connecting to a host computer since USB specification doesn't provide any means to filter unwanted or potentially harmful devices. This poses a huge risk for enterprises, and more particularly, IT administrators who are responsible for securing their IT systems and devices. Still further, USB devices may contain executable programs that can run on (and potentially harm) the computer 150.

In connection with network interfaces 106-4, data sent over a network can include sensitive information that is also subject to interception. Moreover, network data received by computer 150 can include harmful applications such as viruses and malware. Some organizations provide some level of security over their internal networks using such security protocols as VPN. However, not all network connections by computers in an organization utilize a VPN security protocol. And even when they do, they are not always automatically started prior to boot/network connection, providing a window of opportunity for the resident malware to send/receive information. Moreover, VPN connections in software are fairly slow and they do not support high-bandwidth connections, such as those in the hundreds of megabits/sec (e.g. 100 Mbs or 1 Gbs Ethernet and higher). In principle, all network communications using an organization's computers (whether internal or external) should be secured.

It should be apparent from the foregoing that many applications would benefit from the ability to seamlessly and unobtrusively add security over the above and other subsystems and/or from the ability to centrally manage such additional security features over the computer devices of an organization.

SUMMARY OF THE INVENTION

The present invention relates to a system and architecture for securing otherwise unsecured computer subsystems and IO interfaces that addresses the above shortcomings among others. According to one aspect, the invention provides an independent hardware platform for running software in a secure manner. According to another aspect, the invention provides the means to control and secure all disk, network and other I/O transactions. According to still further aspects, the invention provides a means to monitor and prevent unauthorized user and malicious software activity Additional aspects include providing a secure platform for device and user authentication as well as encryption key management, providing a means to perform background backup snapshots, and providing the means for enabling full management over computer operations.

In accordance with these and other aspects, a secure computer according to embodiments of the invention includes a plurality of subsystems for receiving, storing, retrieving from storage and outputting data, a host system running an operating system and applications that receive, store, retrieve and output the data, and a secure subsystem that controls access by the host systems to the plurality of subsystems.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to general aspects, embodiments of the invention include a secure computer platform creating a robust area of trust, secure processing, secure I/O and security management. In embodiments, the secure computer architecture includes a secure subsystem that operates independently alongside a host processor, eliminating the need to modify the host CPU hardware or software (e.g. operating system and/or applications). The secure subsystem is responsible for all security, management, data integrity, activity monitoring, archival and collaboration aspects of the secure computer. According to certain additional aspects, the security functions performed by embodiments of the invention can be logically transparent to both the upstream host and to the downstream device(s).

Figure 1A:
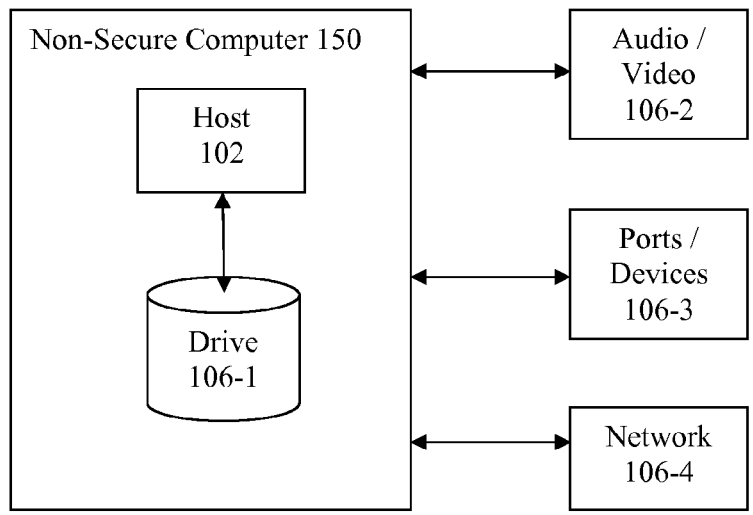
FIG. 1A is a block diagram illustrating an example non-secure computer system according to the prior art.
Figure 1B:
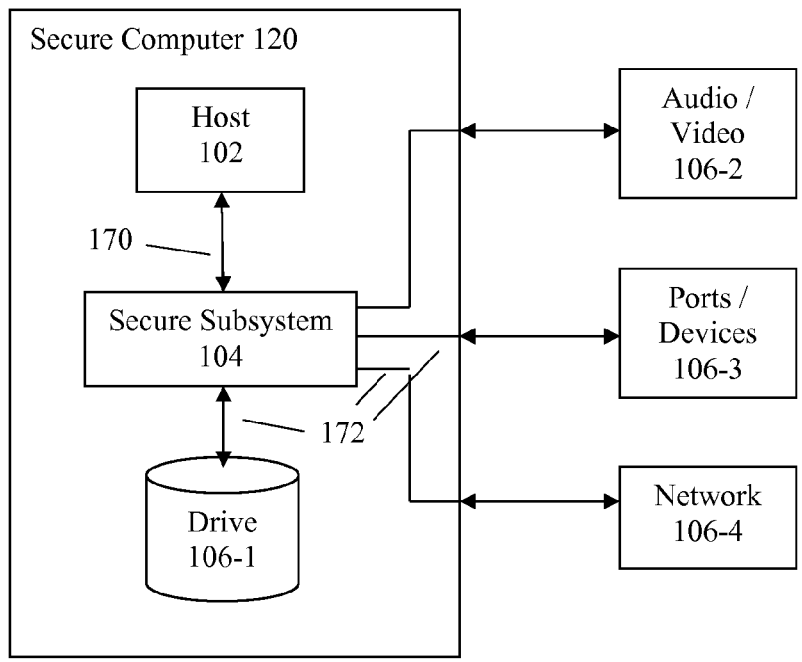
FIG. 1B is a block diagram illustrating an example secure computer system according to embodiments of the invention.

FIG. 1B illustrates an example secure computer 120 according to embodiments of the invention.

As can be seen in comparison to the prior art computer 150 in FIG. 1A, and in accordance with certain aspects of the invention, secure computer 120 includes secure subsystem 104. In general, secure subsystem 104 operates alongside of and is agnostic of the host 102 (i.e. its hardware, software and operating system). For example, it does not share memory space with the host 102 nor is it accessible from the host CPU's operating system and applications. Similarly, the host 102 has little or no knowledge of the existence of the secure subsystem 104. All data visible to the host 102 is secure, and all data stored on disk 106-1 or on other devices connected through ports 106-3 (e.g. USB mass storage device) or sent over the network 106-4 is secure. According to further aspects, the performance of subsystems associated with devices 106 is not reduced by the actions of secure subsystem 104.

Certain other aspects of secure computer 120 contrast with those of prior art computer 150. In a desktop PC implementation, for example, conventional computer 150 typically includes open interfaces (not shown), such as a PCI or PCIe expansion bus, by which host 102 connects to and communicates with devices 106. The present inventors recognize, however, that this presents a potential security breach, such as where a probe could be inserted to extract/insert data/viruses, etc. In embodiments, therefore, the host 102 of secure computer 120 communicates with devices 106 only through secure subsystem 104 via secure connection 170 and is not connected to any expansion bus such as PCI or PCIe.

Secure connection 170 can be implemented in various ways, depending perhaps on the implementation of host system 102 and secure subsystem 104. In one example where host system 102 includes a CPU on a separate chip as secure subsystem 104 but on a common motherboard, secure connection 170 can be implemented by embedded motherboard traces. In another example, host system 102 and secure subsystem 104 are implemented in a common chip such as a SOC. In this example, secure connection 170 includes internal chip traces.

Similarly, and in further contrast to conventional computer 150 according to aspects of the invention, connections 172 between secure subsystem 104 and devices 106 are also secured. However, it may not always be physically possible to make connections 172 completely inaccessible to the outside world. Accordingly, in embodiments these connections 172 are made secure by encrypting data between subsystem 104 and devices 106. It should be noted that certain connections 172 in embodiments of the invention can include a conventional bus such as a dedicated PCIe bus. However, host 102 has no direct access whatsoever to devices 106 connected to these connections 172, and vice-versa, except via subsystem 104.

In accordance with aspects of the invention, embodiments of secure subsystem 104 transparently perform one or more of the following security functions in connection with drive 106-1: data security (e.g. encryption of data stored on drive 106-1, key management, anti-virus scanning); and data integrity (e.g. server-based backup using a snapshot mechanism);

In connection with ports/devices 106-3, embodiments of secure subsystem 104 transparently perform one or more of the following security functions: data security (e.g. encryption of data sent from host 102, key management); gatekeeping (e.g. preventing a prohibited device from connecting to host 102); data snooping; and keyboard and mouse emulation (e.g. emulating keyboard and mouse commands by subsystem 104 separately from commands from actual keyboards and mice devices 106-3).

In connection with network interface 106-4, embodiments of secure subsystem 104 transparently perform one or more of the following security functions: VPN (e.g secure tunnel over Ethernet connection intended to protect all network traffic); and three-way switch (e.g. to direct incoming network traffic to one of the two hosts 102 or 104).

In connection with audio/video devices 106-2, embodiments of secure subsystem 104 transparently perform one or more of the following security functions: video overlay of the video streams from the host system 102 and secure subsystem 104; video watermarking; display privacy; screen analytics, such as OCR; remote screen viewing; mixing audio inputs from the host system 102 and secure subsystem 104; audio watermarking; and forwarding of audio to a remote management system.

Secure computer 120 may be implemented as a desktop PC, notebook, thin client, tablet computer, smart phone, server, or any other type of computing device (e.g. TelePresence Unit, ATM machine, Industrial Controls, etc.).

It should be noted that, in embodiments such as that shown in FIG. 1, the secure subsystem 104 controls access to all interfaces and peripheral devices 106 of computer 120. However, this is not necessary, and other embodiments allow for certain of these devices 106 to be accessed directly by host 102 in the conventional manner. It should be further noted that the particular number and/or combination of devices and interfaces 106 can also depend on the particular implementation of secure computer 120.

In one possible implementation, secure subsystem 104 is a standalone subsystem, and is not configurable. However, according to certain management aspects of the invention, in embodiments, secure subsystem 104 is configurable and one or more secure computers are managed either centrally or remotely by a remote management system.

Figure 2:
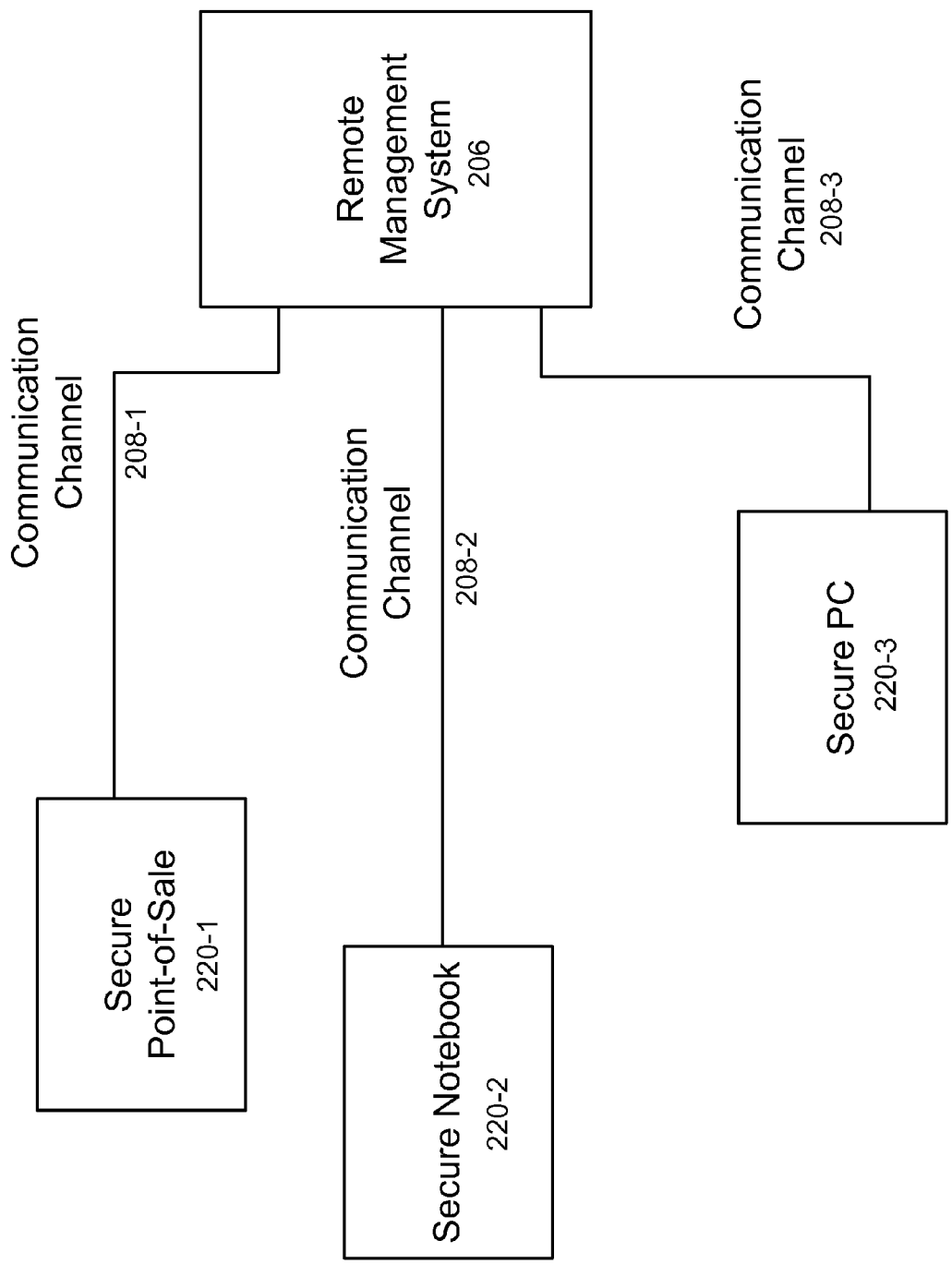
FIG. 2 is a block diagram illustrating an example system for managing a plurality of secure computer devices according to embodiments of the invention.

FIG. 2 shows an example of system for implementing and managing secure computers according to embodiments of the invention.

In this example, there are three types of secure computers: a PC 220-3, a notebook computer 220-2, and a point-of-sale device 220-1, each connected to a remote management system 206 by a respective communication channel 208. Although not shown separately, a secure subsystem 104 is embedded into each of the appliances 220 and operates transparently to the normal functioning of the device.

In this example, secure PC 220-3 is similar to a conventional standalone desktop computer. In such an example, host 102 is implemented by a CPU (e.g. x86), a conventional operating system such as Windows and associated device driver software.

Likewise, in this example, secure notebook computer 220-2 is similar to a conventional standalone notebook computer. In such an example, host 102 is implemented by a CPU (e.g. x86), a conventional operating system such as Windows and associated device driver software. Unlike PC 220-3, however, peripherals such as displays, keyboards and mice are integrated within the computer 220-2 and are not controlled via external interfaces such as HDMI and USB.

In secure point-of-sale device 220-1, host 102 can be implemented by an embedded and/or industrial PC.

In these and other examples of secure computers 220, subsystem 104 is preferably an embedded system. As such, it runs a designated software system furnished together with an embedded processor, and cannot be modified by the end-user of the computer under any circumstances. Various aspects of the types of security functionality performed by secure subsystem 104 that can be adapted for use in the present invention are described in more detail below. Those skilled in the art will be able to understand how to implement the security functionality of the invention using software and embedded processors after being taught by the present examples.

FIG. 2 further shows a Remote Management system 206 coupled to secure computers 220 by respective communication channels 208. Channels 208 can be implemented in various ways, possibly depending on the number and type of devices to be managed by system 206. Channels 208 can be separate direct point-to-point links between system 206 and computers 220. In other embodiments, channels 208 can be implemented by a transmission medium that is shared between many computers 220. In these and other embodiments, the medium can be any combination of wired or wireless media, such as Ethernet or Wireless LAN. In these and other embodiments, channels 208 can be implemented by various types and/or combinations of public and private networks using proprietary protocols running on top of conventional protocols such as UDP or TCP. In some embodiments, data sent over three communication channels described above is encrypted to improve security, for example using a secure VPN connection.

According to general aspects, in embodiments of the invention, remote management system 206 is responsible for managing policies that control the secure subsystem's security functionality, including whether or not to perform data encryption, whether and how to perform data snooping, device gatekeeping lists, etc. Based on these lists, and devices attached to interfaces of computers 220, remote management system 206 sends appropriate configuration information to computers 220 via channels 208. System 206 also receives and perhaps further processes data sent to system 206 from devices 220 such as video data from a computer's monitor, history of attached devices, keyboard and mouse input data, and disk backup data.

Various aspects of a remote management system and/or security policies that can be adapted for use in the present invention are described in more detail in co-pending application Ser. No. 13/971,711, the contents of which are incorporated herein by reference in their entirety.

Figure 3:
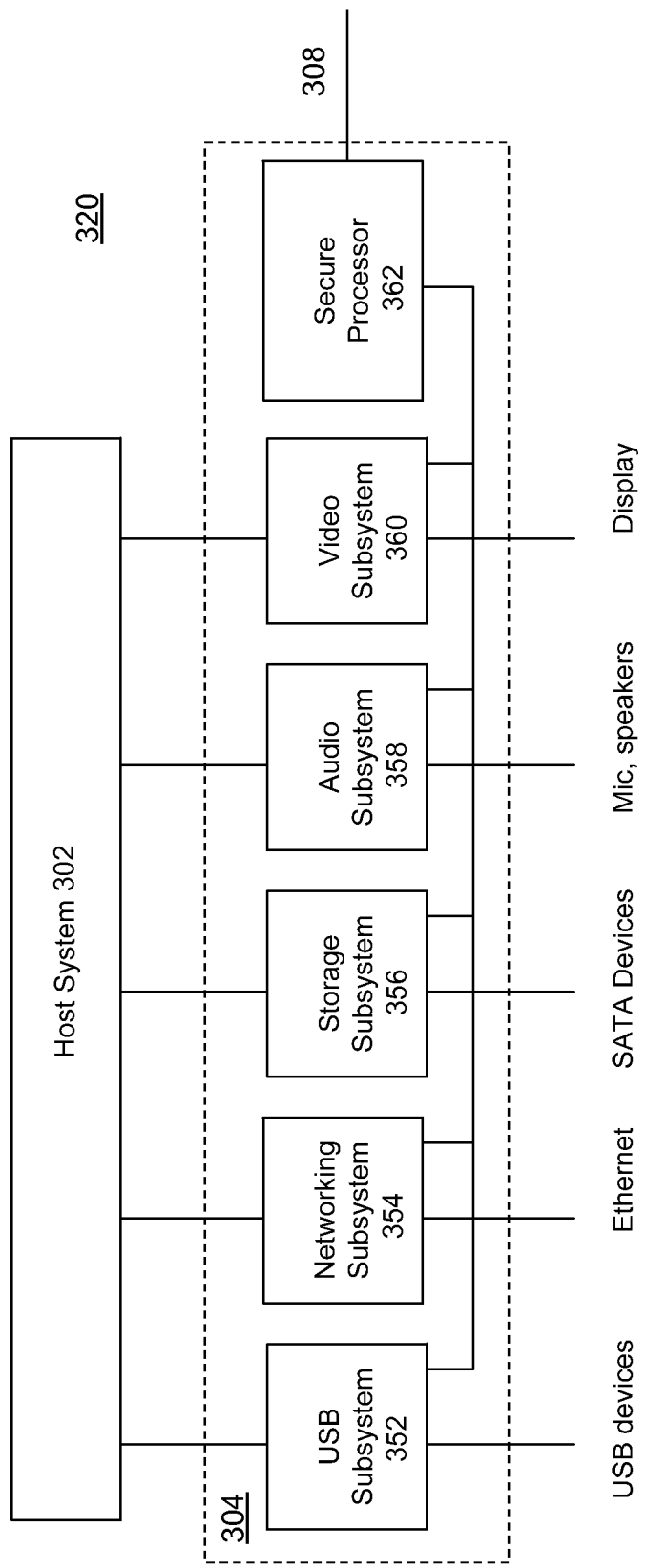
FIG. 3 is a more detailed block diagram illustrating an example architecture for a secure computer system according to embodiments of the invention.

FIG. 3 is a block diagram of an example secure computer 320 according to embodiments of the invention.

As shown, secure computer 320 includes a host system 302 and a secure subsystem 304. Host system 302 includes its own CPU (e.g. x86, ARM-based apps processor, server CPU, MIPS, QorIQ or PowerPC), memory & I/O sub-system. In embodiments, host system 302 has no direct access to the secure subsystem 304. According to transparency aspects of the invention, the interface between host system 302 and secure processor 304 is implemented using host system 302's standard interfaces with devices 106, such as standard I/O, networking and storage interface. In some embodiments, there may be a control interface between the secure subsystem 304 and host system 302 with a predefined communications protocol over a dedicated hardware interface (e.g. UART) or a hardware-based handshake only (e.g. GPIO).

Secure subsystem 304 controls the overall operation of secure computer 320, including access by host system 302 to all peripherals. Importantly, according to aspects of the invention, host system 302 is unable to directly exchange data with some or all of the computer system peripherals such as USB and other I/O devices, network interfaces, storage devices and audio/video devices except via secure subsystem 304. In embodiments, secure subsystem 304 further controls all power management functions such as power on sequence, power down sequence, and entering and exiting low-power modes. Further, the secure processor 362 in secure subsystem 304 is booted first, and it goes to sleep or powers-down last. All aspects of BIOS authentication and update are managed by the secure subsystem 304. Certain aspects of a computer having a host system 302 and whose overall operation is managed by secure subsystem 304 are described in co-pending application Ser. No. 13/396,582, and can be adapted for use in the present invention.

In an example embodiment where computer 320 is similar to a conventional desktop PC, computer 320 includes a motherboard, host CPU, system bus, and memory. Differently from a conventional desktop PC, however, computer 320 does not include an expansion bus such as PCI or PCIe accessible to the host CPU. In one such embodiment, subsystem 304 is implemented by an ASIC or FPGA that is separate from the host CPU and data is sent between host system 302 and secure subsystem 304 over secure, embedded traces on the motherboard. In other embodiments, including where computer 320 is a tablet or mobile device (e.g. smartphone), or in other implementations where power, area and/or cost constraints are factors, both host system 302 and secure subsystem 304 are implemented in the same SOC.

Another possible embodiment includes providing secure subsystem 304 on a PCIe card in a conventional computer's PCIe expansion bus. Differently from the conventional computer PCIe expansion bus, however, this embodiment includes a "secure" PCIe connector that would prevent someone from inserting a "probe" between the connector and the card in order to trace the non-encrypted data between the host system 302 and secure subsystem 304. This secure connector is preferably secure and destructive. The PCIe card could be inserted into a standard motherboard at manufacture time and it wouldn't be able to be removed thereafter. If someone tried to thereafter extract the PCIe card, the connector would "break" and the card wouldn't be able to be inserted again (and function properly). This may be achieved mechanically or even through the use of smart sensors that would detect an "abnormal" insertion of the PCIe card (i.e. the existence of a snooping device, like a simple PCIe extender card).

Secure processor 362 in subsystem 304 is typically implemented as an embedded processor, such as ARM or other embedded processor core. The processor is connected to memory and other system components, including subsystems 352-360 via a shared bus, such as AXI. In embodiments, components that require high-speed data transfer are connected via dedicated point-to-point DMA channels.

Although not shown in detail in FIG. 3, embodiments of secure processor 362 include: a CPU (e.g. a single or many core CPU complex); local DDR memory and caches; non-volatile storage (e.g. flash memory); peripherals (e.g. I2C, SPI, UART, GPIO, and others); and media engines (e.g. 2D/3D graphics, audio/video compression). In general, secure processor 362 performs two primary tasks: to configure and manage all the sub-systems, and to run secure software stacks, applications, etc As shown in the example of FIG. 3, computer 320 also includes peripherals (keyboard, mouse, camera, mic, speakers, etc.), peripheral interfaces (USB, etc.), video (i.e. display), networking (e.g. Ethernet), SATA devices (e.g. storage HDD/SSD).

As further shown, and as described in more detail below, each of these peripherals has a corresponding subsystem 352-360 in secure subsystem 304 that essentially implements a secure I/O environment. They provide a secure bridge between host system 302 and the actual devices and implement security tasks such as data encryption/decryption, gatekeeping and snooping. According to aspects of the invention, each subsystem 352-360 performs these functions transparently to the host system 302, in real-time, with minimal delay and in hardware (fast path).

In addition to managing the security tasks performed by subsystems 352-360, secure processor 362 performs such tasks as exception handling, analyzing data captured by subsystems 352-360, accumulating traffic statistics, etc. Secure processor 362 also includes a network interface for communicating with remote management system 206 via communication channel 308. Such communications can include receiving policies for the security functions performed by subsystems 352-360 from management system 206, sending data captured by subsystems 352-360 to management system 206, and sending alerts of certain violations or threats detected by subsystems 352-360 to management system 206.

In embodiments, the secure processor 362 receives logged/snooped information from the various subsystems and runs an application to store and analyze it for potential threat behavior. This can include correlating data from the various subsystems of the secure computer as well as cross-correlating data between different secure computers. If a threat is detected, then an alarm is sent to remote system 206, which will in return modify a policy and apply it to the suspicious secure computer. This may limit or shut down a certain interface, or lockout a certain user or shut down the entire computer, etc.

In embodiments, USB subsystem 352 is responsible for one or more tasks associated with attached USB devices such as data security (e.g. encryption, key management), gatekeeping, data snooping, and keyboard and mouse emulation. Example aspects of these and other security tasks that can be adapted for use in the present invention are described in more detail in co-pending application Ser. Nos. 13/971,582, 13/971,604 and 13/971,632, for example.

In embodiments, networking subsystem 354 is one or more tasks associated with Ethernet, WiFi, and 3G devices such as secure protocols for secure, high-bandwidth connections (e.g. IPSec, SSL/TLS) and network processing, including classification and flow control engines.

In embodiments, storage subsystem 356 is responsible for one or more tasks associated with internal or external storage devices (e.g. SATA devices) such as data security (encryption, key management, anti-virus scanning), data integrity (e.g. server-based backup using snapshot mechanism) and data compression. Example aspects of these and other security tasks that can be adapted for use in the present invention are described in more detail in co-pending application Ser. Nos. 13/971,732 and 13/971,651, In embodiments, audio subsystem 358 and video/graphics subsystem 360 are responsible for one or more tasks associated with audio/video devices such as displays, speakers, microphones and cameras such as multi-layer video resize, alpha-blending, audio mixing, audio and video watermarking (visible and invisible), 2D/3D graphics acceleration, compression, secure remote desktop, video conferencing, video surveillance, and desktop and video analytics applications. Example aspects of these and other security tasks that can be adapted for use in the present invention are described in more detail in co-pending application Ser. No. 13/971,692.

In embodiments, every aspect of how secure subsystem 304 manages the operation of computer 320 is controlled by the remote management system 206 either dynamically or according to predefined policies stored and/or sent to the secure subsystem 304. In embodiments, I/O interfaces are remotely controlled, monitored and backed up by the remote management system 201, and may be limited or shut down completely if needed.

In embodiments where data written/read to/from storage and I/O devices as well as network traffic is encrypted/decrypted, the encryption and authentication keys are managed by the remote management system 206 and may be cached locally on the secure subsystem 304.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A secure computer comprising:
   a plurality of peripheral subsystems for receiving, storing, retrieving from storage and outputting data;
   a host system running an operating system and applications that receive, store, retrieve and output the data, the host system including a system bus and an interface for connecting the host system to an expansion bus that is separate and independent from the system bus, the expansion bus being one of a Peripheral Component Interconnect (PCI) and a PCI Express (PCIe) expansion bus;

a secure subsystem that controls access by the host system to the plurality of peripheral subsystems for receiving, storing, retrieving and outputting the data; and a secure connection between the expansion bus interface of the host system and the secure subsystem that connects the plurality of peripheral subsystems to the host system.

2. The secure computer according to claim 1, wherein the host system comprises one of a x86 processor, ARM processor, MIPS processor, QorIQ processor and PowerPC CPU.

3. The secure computer according to claim 1, wherein the plurality of peripheral subsystems includes one or more of a video subsystem, an audio subsystem, a storage subsystem, a networking subsystem and a Universal Serial Bus (USB) subsystem.

4. The secure computer according to claim 1, wherein the secure subsystem is implemented by a Field-Programmable Gate Array (FPGA) or Application-Specific Integrated Circuit (ASIC).

5. The secure computer according to claim 1, wherein the secure subsystem is configurable by a remote management system external to the secure computer.

6. The secure computer according to claim 5, wherein the remote management system communicates with the secure subsystem via a network.

7. The secure computer according to claim 5, wherein the remote management system specifies how the secure subsystem controls access to the plurality of peripheral subsystems by the host system.

8. The secure computer according to claim 1, wherein the secure subsystem comprises an embedded processor.

9. The secure computer according to claim 7, wherein the embedded processor comprises an ARM processor.

10. The secure computer according to claim 1, wherein the plurality of peripheral subsystems comprises a Serial Advanced Technology Attachment (SATA) storage subsystem.

11. The secure computer according to claim 10, wherein the SATA storage subsystem supports hard drives or solid state drives connected via SATA 1.5, 3.0 and 6.0 Gbs protocols.

12. The secure computer according to claim 10, wherein the SATA storage subsystem manages prioritized access to an attached SATA storage device by the host system and the secure subsystem.

13. The secure computer according to claim 10, wherein the secure subsystem performs one or more of encryption of data as it is stored by the SATA storage subsystem and anti-virus scanning of data by the SATA storage subsystem.

14. The secure computer according to claim 10, wherein the secure subsystem performs automated backup of data stored by the SATA storage system.

15. The secure computer according to claim 14, wherein the automated backup is performed transparently to the host system.

16. The secure computer according to claim 2, wherein the USB subsystem supports any devices connected via USB 1.1, 2.0 or 3.0 protocols.

17. The secure computer according to claim 16, wherein the secure subsystem performs one or more of encryption of data sent via the USB subsystem, gatekeeping of devices attempting to attach via the USB subsystem, and snooping of data sent or received via the USB subsystem.

18. The secure computer according to claim 2, wherein the secure subsystem performs one or more of video overlay of video streams from the host system to the video subsystem, watermarking of video displayed via the video subsystem, analytics of screens displayed via the video subsystem, remote screen viewing of video displayed via the video subsystem and remote storing and analyzing of video displayed via the video subsystem.

19. The secure computer according to claim 18, wherein the analytics comprises Optical Character Recognition (OCR).

20. The secure computer according to claim 2, wherein the secure subsystem performs one or more of mixing of audio streams from the host system and secure subsystem for output via the audio subsystem, watermarking of audio streams output via the audio subsystem, and forwarding of audio output via the audio subsystem to a remote management system.

* * * * *